F. N. BARDWELL.
RESILIENT WHEEL AND TRANSMISSION THEREFOR.
APPLICATION FILED JULY 9, 1919.
1,378,756.
Patented May 17, 1921.
2 SHEETS—SHEET 1.
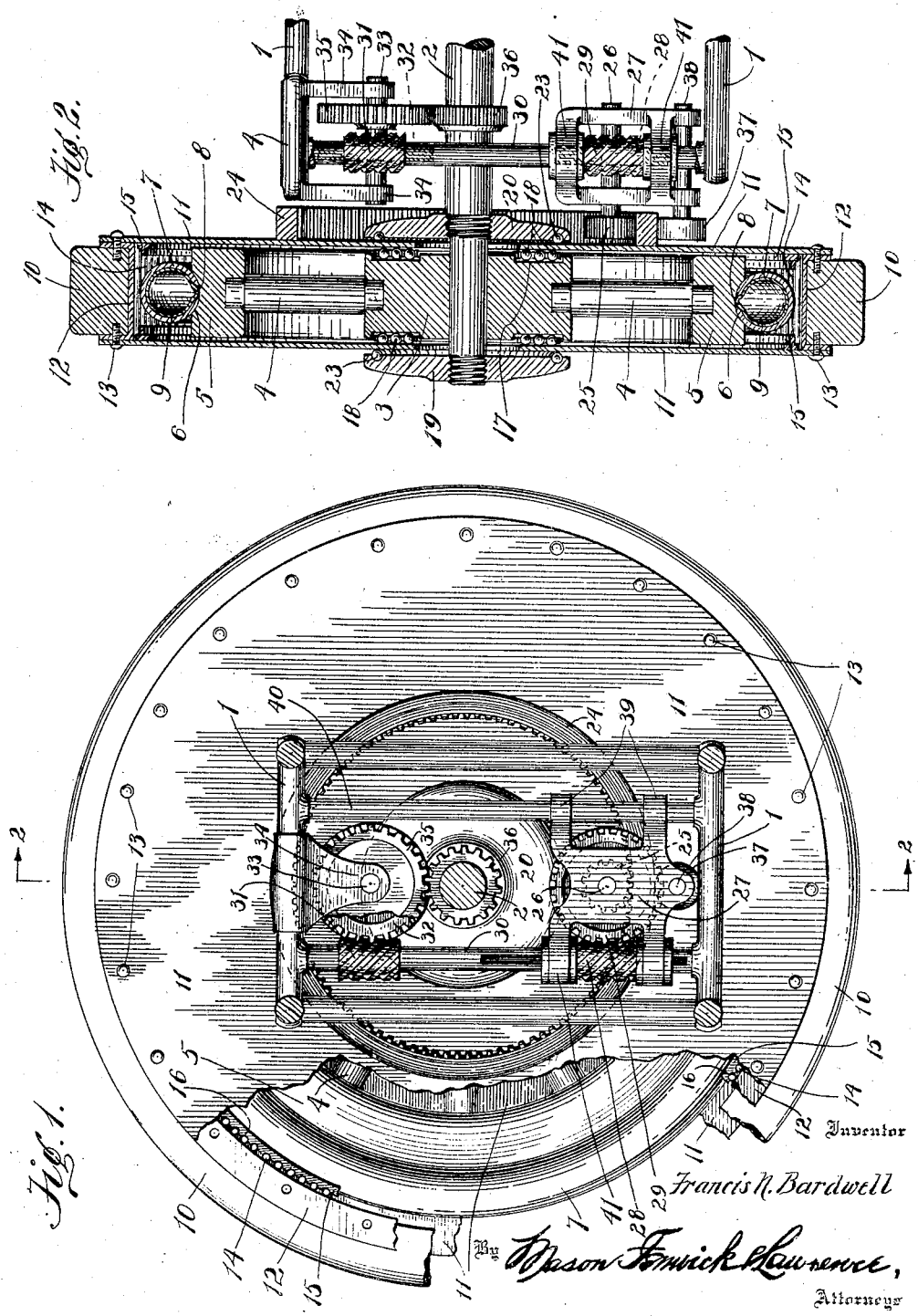
Inventor
Francis N. Bardwell
By Mason Fenwick Lawrence,
Attorneys F. N. BARDWELL.
RESILIENT WHEEL AND TRANSMISSION THEREFOR.
APPLICATION FILED JULY 9, 1919.
1,378,756.
Patented May 17, 1921.
2 SHEETS—SHEET 2.
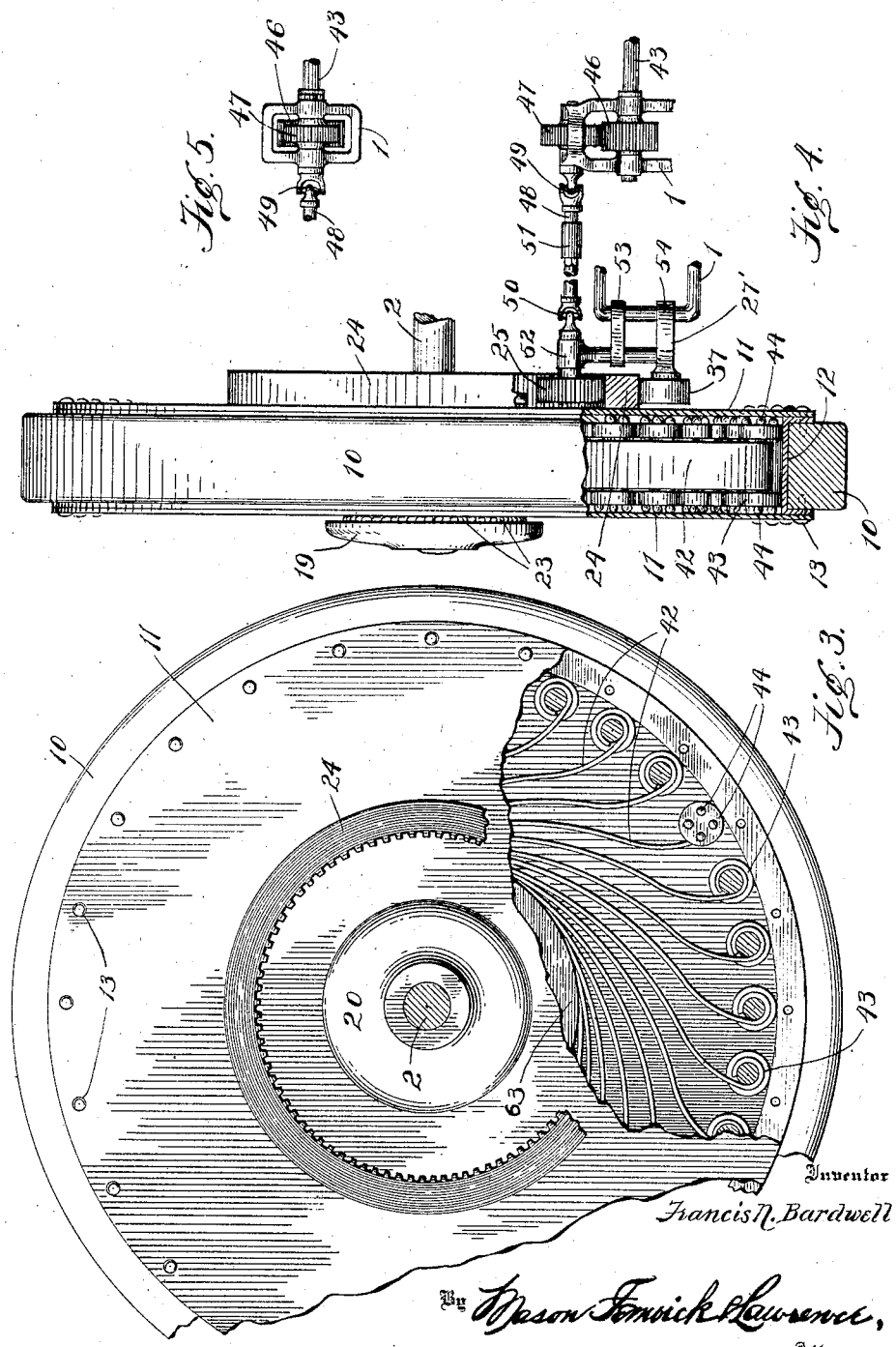

UNITED STATES PATENT OFFICE.

FRANCIS N. BARDWELL, OF PASSAIC, NEW JERSEY.

RESILIENT WHEEL AND TRANSMISSION THEREFOR.

1,378,756.  Specification of Letters Patent.  Patented May 17, 1921.

Application filed July 9, 1919. Serial No. 309,718.

*To all whom it may concern:*

Be it known that I, FRANCIS N. BARDWELL, a citizen of the United States, residing at Passaic, in the county of Passaic and State of New Jersey, have invented certain new and useful Improvements in Resilient Wheels and Transmissions Therefor; and I do hereby declare the following to be a full, clear, and exact description of the invention, such as will enable others skilled in the art to which it appertains to make and use the same.

This invention relates to improvements in resilient wheels wherein the driving power is applied directly to the shoe or tread of the wheel.

The object of this invention is to supply a resilient wheel of the character described wherein flexible transmission means are provided to transmit the driving power to the shoe or tread thereby preventing lost motion due to flexibility of the supporting members of the wheel.

A further object is to provide a slidable set of gears mounted upon the frame of the vehicle and traction member of the wheel and held in positive connection with the traction member of the wheel to assure positive engagement.

How these and other objects hereinafter described are attained is shown in the accompanying drawings in which—

Figure 1 is a side elevation of a wheel embodying the principle of this invention, and shows portions broken away.

Fig. 2 is a section taken on the line 2—2 of Fig. 1.

Fig. 3 is a side elevation showing a modified form of wheel.

Fig. 4 is an end view, shown partly in section, of the form shown in Fig. 3 and illustrates a modified form of transmission, and Fig. 5 is a plan view of a part of the transmission shown in Fig. 4.

Referring more particularly to the disclosure in said drawing, the invention comprises essentially a body member for the wheel and a traction member which are held in normally concentric relation by suitable resilient means interposed therebetween. In Figs. 1 and 2, the resilient means included between said body member and traction member is shown as a pneumatic tube whereas in Figs. 3 and 4, this resilient means is shown as springs. In Figs. 1 and 2, furthermore, the body member is shown made up of a hub 3, spokes 4 and felly 5, whereas in Fig. 3, the body member is shown as a disk 63. The invention as disclosed in Figs. 1 and 2 more particularly includes a frame member 1 attached to the body of the car adjacent the axle 2 upon which the body portion of the wheel is rotatably mounted. In the disclosure of Fig. 1, it will be noted that the felly 5 of this wheel body portion is formed with an annular groove 6 in which is mounted a heavy resilient outer tube 7 having a slot 8 along its inner periphery to admit an inner air tube 9.

An outer tread or traction member 10 of resilient material, preferably of rubber, is held in juxtaposition to the outer tube and is retained in such position by means of side plates 11 and an annular channeled member 12 which is secured to the plates by means of screws 13 threaded through the plates and engaging the resilient tread as indicated in Fig. 2.

Interposed between the canneled member 12 and the outer air tube 7 are rollers 14 retained in position by means of angular rings 15 having recesses 16 in which the ends of the rollers engage.

The hub 3 is provided with annular recesses 17 in which anti-friction members 18 engage which in turn engage the side plates. Nut and washer members 19 and 20 are employed to properly hold and position the wheel upon the axle shaft 21 and are provided with annular recesses 21 and 22 respectively to inclose anti-friction members 23.

An internal gear 24 is attached to one side plate and coacts with a pinion gear 25 which is carried upon a shaft 26 rotatably mounted in a supporting frame and bearing 27. The shaft is in turn provided with a worm-driving gear 28 which engages a worm gear 29 slidably mounted upon the lower end of a shaft 30 rotatably mounted in the frame 1, while at the upper end of the said shaft a worm gear 31 is fixedly attached and in turn engages and coacts with a complementary worm gear 32. This worm gear 32 is secured to a shaft 33 which is rotatably mounted in bearings 34 on the frame 1.

A gear 35 is securely attached to the shaft 33 and engages a gear 36 upon the axle 2 which is rotated, through regular differential and transmission means, by the driving motor located upon the vehicle.

To lock or retain the pinion gear in constant mesh with the internal gear, a roller 37 is employed which engages along the outer periphery of the internal gear and which is carried upon a shaft 38 in turn rotatably mounted in the frame 27.

The frame 27 is provided with arms or collars 39 which slidably engage a rod 40 upon the frame 1 and the worm gear 29 is held, properly positioned with respect to its complementary worm gear, by means of collars 41 formed upon the frame 27.

The worm gear 29 is keyed to the shaft 30 to rotate with it, but is permitted to slide upon same as hereinbefore stated.

In operation, driving power is transmitted to the axle 2 and from its connected gear 36 to the gear 35, upon the shaft 33, thence through the worms 32 and 31 to the shaft 30 which in turn transmits to the shaft 26, through the sliding worm 29 and its complementary worm 28 upon the shaft 26. The shaft in its rotation revolves the pinion gear which, coacting with the meshed internal gear transmits rotary movement to the side plates and connected shoe or tread 10.

It will be noted that the worms 31 and 32 and the gears 35 and 36 are relatively fixed with respect to one another, and the worms 28 and 29 and the gears 24 and 25 are relatively fixed with respect to one another.

The change in relative position of one of the groups mentioned to the other, due to vibratory action of the vehicle body, is absorbed or taken up by the sliding action of the bearing frame 27 upon the shaft 30 and rod 40. The variation in the relative position of the two groups of gears, due to the resilient action of the air tube and tread members of the wheel is similarly taken up by the sliding action of the bearing frame.

It is obvious, from this description taken in connection with the illustrations, that positive rotary movement is imparted to the tread of the wheel without resultant lost motion and power as is commonly formed in other resilient wheels at present in use. The wheel normally turns about its axle 2, the body portion and the traction member 10 rotating together. Obviously by this construction the friction of the wheel upon the axle 2 is no greater than ordinarily occurs in any wheel. By rotating the wheel normally upon the axle rather than having the normal rotation between the wheel body and traction member, the much greater friction of this very much more extended bearing surface does not have to be considered. Therefore the body portion may be of considerable diameter if so desired. It is important, however, that the body portion be free to move in any direction diametrically with respect to the traction member so that no matter to what position the wheel is rotated the traction member may respond to and in the direction of an external force applied thereto. Such freedom of movement is attained by mounting the body portion of the wheel and the traction member to be independently rotatable.

The modifications shown in Figs. 3, 4 and 5 differ from the device illustrated in Figs. 1 and 2 in some minor constructional details.

In the modified form shown, the resilient means interposed between the body member 63 of the wheel and the tread member 10 is a plurality of springs 42 secured to the body portion 63 of the wheel at their inner ends and provided at their outer ends with rollers 43. The rollers engage the inner periphery of the channeled member 12 and are provided with anti-friction balls 44 which engage along the side plates 11.

It will be obvious that the resilient means of both my preferred and modified structure is positioned between the body portion of the wheel and the traction member. The resilient means in both cases likewise extends entirely around the wheel, that is, either a single resilient means or a series of resilient devices may be employed, the series of devices constituting a resilient means the effect of which is the same as a single resilient means in that the traction member may be resiliently depressed toward the body portion at any point upon its circumference. It is therefore to be understood that when I refer to a resilient means between the body portion and traction member, that I include both a single means and a plurality of devices constituting a resilient means all the way around the wheel.

Further, instead of applying the transmission directly from the axle 2, the shaft 45 receives the driving power directly from each side of the differential and conveys rotary movement by means of gears 46 and 47, which are mounted upon the frame 1, to a shaft 48 which is provided with universals 49 and 50 and sliding extension joint 51.

The universal 50 acts as a connecting means between the shaft 48 and a shaft carrying the pinion gear 25 which is mounted in a bearing 52 formed upon a frame 27'. The said frame is slidably mounted upon the frame 1 as at 53 and 54.

It is obvious that various modifications may be embodied in this invention without departing from the spirit of same and it will therefore be understood that this invention is not limited to the particular constructions shown.

Having thus described my invention, I claim:

1. A resilient wheel comprising a body portion, a traction member free to rotate independently of said body portion, resilient means between said body portion and traction member around the entire periphery of said body portion for sustaining said parts normally in concentric relation, and adapted to permit depression of the traction member in any radial direction, and means for rotating the said traction member.

2. A resilient wheel comprising a body portion, a traction member free to rotate independently of said body portion, resilient means between said body portion and traction member around the entire periphery of said body portion for sustaining said parts normally in concentric relation and adapted to permit depression of the traction member in any radial direction, and flexible means for rotating the said traction member independently of said body portion.

3. A resilient wheel comprising a body portion, a traction member free to rotate independently of said body portion, resilient means between said body portion and traction member for sustaining said parts normally in concentric relation, and flexible means for rotating the said traction member independently of said body portion, said flexible means arranged and adapted to compensate for the radial movement of the tread member with respect to the body portion.

4. A resilient wheel comprising a body portion, a traction member free to rotate independent of said body portion, resilient means between said body portion and traction member for sustaining said parts normally in concentric relation, anti-friction means between said resilient means and traction member for permitting free rotation of said traction member, and means for rotating said traction member.

5. A resilient wheel comprising an inner body portion and an outer traction member freely rotatable about said body portion, resilient means for supporting one of said parts from the other, an annular series of teeth fast with respect to the traction member, a gear in mesh with said teeth for driving the tread member, and flexible means for driving said gear adapted to compensate for the radial movement of the tread member with respect to the body portion.

6. A resilient wheel comprising an inner body portion and an outer traction member freely rotatable about said body portion, resilient means for supporting one of said parts from the other, an annular series of teeth fast with respect to the traction member, a gear in mesh with said teeth for driving the tread member, a supporting frame for carrying said gear, said frame being slidably mounted thereby permitting radial movement of the gear with respect to the wheel so as to compensate for the radial movement of the traction member in use, and driving means for said gear.

7. A driving means for a wheel rim mounted to have radial movement with respect to the body portion of the wheel, said driving means including a shaft driven from the axle of the wheel, a frame slidable on said shaft radial of the wheel, a worm on the shaft adapted to be slid by the frame, a gear carried by the frame in mesh with the worm, a second gear fast with respect to the first-mentioned gear so as to be driven thereby, an annular series of teeth in mesh with said second gear and fast with respect to the traction member, and means for holding the said second gear in mesh with said teeth.

In testimony whereof I affix my signature.

FRANCIS N. BARDWELL.